(12) United States Patent
Katz

(10) Patent No.: US 7,069,051 B1
(45) Date of Patent: Jun. 27, 2006

(54) DATA TRANSMISSION METHOD AND RADIO SYSTEM

(75) Inventor: Marcos Katz, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/831,049

(22) PCT Filed: Dec. 21, 1999

(86) PCT No.: PCT/FI99/01062

§ 371 (c)(1),
(2), (4) Date: May 4, 2001

(87) PCT Pub. No.: WO00/41339

PCT Pub. Date: Jul. 13, 2000

(30) Foreign Application Priority Data

Dec. 21, 1998 (FI) ........................... 982763

(51) Int. Cl.
*H04Q 7/20* (2006.01)
(52) U.S. Cl. .................. 455/562.1; 455/525
(58) Field of Classification Search .......... 455/422.1, 455/405, 500, 501, 524, 277.1, 277.2, 278.1, 455/561, 562.1, 101, 69, 525, 452.1, 452.2, 455/453, 512, 513, 435.2

See application file for complete search history.

(56) References Cited

U.S. PATENT DOCUMENTS

| | | | |
|---|---|---|---|
| 5,095,535 A | | 3/1992 | Freeburg |
| 5,455,962 A | | 10/1995 | Kotzin |
| 5,590,399 A | | 12/1996 | Matsumoto et al. |
| 5,640,678 A | * | 6/1997 | Ishikawa et al. ............. 455/449 |
| 5,809,019 A | * | 9/1998 | Ichihara et al. ............. 370/334 |
| 6,415,141 B1 | * | 7/2002 | Kakura et al. ............. 455/277.1 |
| 6,473,466 B1 | * | 10/2002 | Miyashita et al. ........... 375/267 |
| 6,483,884 B1 | * | 11/2002 | Shen et al. .................. 375/347 |
| 6,600,934 B1 | * | 7/2003 | Yun et al. ................. 455/562.1 |

FOREIGN PATENT DOCUMENTS

| | | |
|---|---|---|
| EP | 0 696 113 | 2/1996 |
| FI | 952531 | 11/1996 |
| FI | 974102 | 5/1998 |
| WO | WO 98/19401 | 5/1998 |

* cited by examiner

*Primary Examiner*—Jean Gelin
(74) *Attorney, Agent, or Firm*—Pillsbury Winthrop Shaw Pittman LLP

(57) ABSTRACT

The invention relates to a data transmission method and a radio system comprising at least one subscriber terminal and at least one base station including an antenna, by means of which the base station transmits signals to the subscriber terminal. The subscriber terminal includes a measuring mechanism which determines the quality of the signals received by the subscriber terminal by comparing the received signals with at least one signal quality threshold level. When only one signal exceeds the threshold, the subscriber terminal sends to the base station, which transmitted the signal that exceeded the threshold, a command to use, when transmitting a signal to the subscriber terminal, the antenna with which the signal that exceeded the threshold was transmitted, or the transmission direction to which the signal that exceeded the threshold was transmitted.

8 Claims, 3 Drawing Sheets

DATA TRANSMISSION METHOD AND RADIO SYSTEM

This application is the National Phase of International Application PCT/FI99/01062 filed Dec. 21, 1999 which designated the U.S. and that International Application was Published under PCT Article 21(2) in English.

FIELD OF THE INVENTION

The invention relates to a data transmission method used in a radio system comprising a subscriber terminal and at least one base station transmitting signals to the subscriber terminal by means of its antenna.

BACKGROUND OF THE INVENTION

In transmitting signals, prior art radio systems use various diversity methods to improve the quality of data transmission. Diversity methods include, for instance, orthogonal transmit diversity (OTD), time switching transmit diversity (TSTD) and selective transmit diversity (STD). The above-mentioned diversity methods can be used in future WCDMA systems, for instance. Said methods improve BER performance, for instance, in data transmission. Of the above-mentioned methods, especially the STD method provides the greatest advantages as compared with the OTD and TSTD methods, for instance.

In FDD systems, the STD method can be used in selecting antennas, for instance. In this case, in a radio system, a subscriber terminal, which can be a mobile phone, for instance, selects and advises the base station to select an as optimal antenna as possible for the base station to use in a downlink signal transmission. The selection of antennas is based on measuring the quality of signals transmitted by the base station antennas and comparing the obtained measurement results with each other.

However, the use of STD methods causes load problems in the power amplifiers of the transceiver. The problems are caused because the load of the power amplifiers is not always distributed evenly between the various power amplifiers, and the differences in loads may be relatively big. In a CDMA-type radio system, for instance, a situation may arise in practice where a given transmission branch of a base station is selected to transmit signals to a large number of subscriber terminals which establish simultaneous connections by means of the signals. Such a selection method calls for extensive dynamics of the power amplifier at the transmission branch. Extensive dynamics call for using a high crest coefficient in designing the power amplifiers, which coefficient is determined by the ratio of the maximum output required of the power amplifier and its average output.

Let us assume that the base station comprises a first and a second transmission antenna which transmit a signal to the same subscriber terminal. Let us further assume that the base station comprises a first power amplifier feeding its signal to the first transmission antenna and a second power amplifier feeding its signal to the second transmission antenna. If the subscriber terminal is advantageously located with respect to the first transmission antenna, for instance, the subscriber terminal receives a signal of at least slightly better quality from the first transmission antenna. In practice, it may well be possible that the signal transmitted by the second antenna is also received as a relatively good-quality signal. If the antenna is selected to transmit a signal to mobile phones, of which there are K and to each of which the base station power amplifier transmits the signal at P power, the dynamics of the base station power amplifier must achieve a power level of at least KP.

Because the selection of antennas is based solely on measuring the absolute quality of the signal, the subscriber terminal sends to the base station a command to use the first transmission antenna. If sufficiently many subscriber terminals command the base station to use the first transmission antenna, it is possible that the nominal loadability of the first power amplifier is exceeded. If the subscriber terminal has had to select the better of two base station antennas, for instance, the subscriber terminal can transmit information on the selection by using one selection bit. In the above-mentioned situation, the value of the selection bit may be '1', for instance, indicating the selection of the first transmission antenna, for instance. The value '0' of the selection bit would then have indicated the selection of the second transmission antenna.

The selection method is, however, not optimal from the point of view of the power amplifier load, since the used method may lead to overload in the power amplifier feeding the selected transmission antenna. The load of the power amplifiers is thus too uneven in some situations. Said problems are at least partly caused by the fact that measuring the signal quality is based on absolute values which does not lead to the best possible solution for the operation of the system.

BRIEF DESCRIPTION OF THE INVENTION

The object of the invention is thus to implement a method and an apparatus implementing the method in such a manner that the above-mentioned problems can be solved. This object is achieved by a data transmission method as described in the specification, characterized by determining the quality of the signals received by the subscriber terminal by comparing the received signals with at least one signal quality threshold level, sending to the base station, which transmitted the signal that exceeded the threshold, information on the antennas which transmitted the signals that exceeded the threshold, or information on the transmission direction, from which the signal that exceeded the threshold was received, selecting from the antennas, which transmitted the signal that exceeded the threshold, an antenna or antennas to continue the transmission of the signal to said subscriber terminal, or selecting from the transmission directions, from which the signal that exceeded the threshold was received, a transmission direction or directions, to which to continue the transmission of the signal to said subscriber terminal.

In addition, the object is achieved by a data transmission method as described in the specification, characterized by determining the quality of the signals received by the subscriber terminal by comparing the received signals with at least one signal quality threshold level, and when only one signal exceeds the threshold, sending to the base station which transmitted the signal that exceeded the threshold a command to use, when transmitting a signal to said subscriber terminal, the antenna with which the signal that exceeded the threshold was transmitted, or the transmission direction to which the signal that exceeded the threshold was transmitted.

The invention also relates to a radio system comprising at least one subscriber terminal and at least one base station comprising an antenna with which the base station transmits signals to the subscriber terminal.

The radio system of the invention is characterized in that the subscriber terminal comprises a measuring means which determines the quality of the signals received by the subscriber terminal by comparing the received signals with at least one signal quality threshold level, the subscriber terminal sends to the base station, which transmitted the signal that exceeded the threshold, information on the antennas from which the signal that exceeded the threshold was transmitted, or information on the transmission directions from which the signal that exceeded the threshold was received, the base station comprises a means which selects from the antennas, which transmitted the signals that exceeded the threshold, an antenna or antennas which continue to transmit a signal to said subscriber terminal, or the means selects from the transmission directions of the signals, which exceeded the threshold, a transmission direction or directions to which the base station continues to transmit a signal.

In addition, the radio system of the invention is characterized in that the subscriber terminal comprises a measuring means which determines the quality of the signals received by the subscriber terminal by comparing the received signal with at least one signal quality threshold level, and when only one signal exceeds the threshold, the subscriber terminal sends to the base station, which transmitted the signal that exceeded the threshold, a command to use, when transmitting a signal to said subscriber terminal, the antenna with which the base station transmitted the signal that exceeded the threshold, or the transmission direction to which the signal that exceeded the threshold was transmitted.

The preferred embodiments of the invention are disclosed in the dependent claims.

The invention is based on the idea that the subscriber terminal measures the signals transmitted by the base station by comparing them to a threshold level, and the transmission antenna, transmission direction or beam used by the base station is selected case by case either in the subscriber terminal or base station.

The data transmission method and radio system of the invention provide several advantages. With the method of the invention, the load of the amplifiers in the base station of the radio system can continuously be distributed as evenly as possible between each amplifier. Since the load remains even, the dynamics of the amplifiers need not be as extensive as in amplifiers used in prior art radio systems, thus facilitating the design of amplifiers.

The method minimizes the unevenness of load between power amplifiers by letting the base station select the transmission antenna of a downlink transmission, when necessary. If the base station uses adaptive antennas, the method of the invention makes it possible to select a transmission direction which causes as little interference as possible to the other signals in the radio network.

In addition, the method makes it possible to implement a flexibly operating radio system. In a receiver, which is a subscriber terminal, of the radio system of the invention, the received signals are categorized by means of threshold levels into different signal groups. Using several thresholds makes it possible to allocate channels more flexibly to receivers. In addition, using thresholds improves the reliability of the antenna selection. The solution of the invention is relatively easy to implement by altering signalling, for instance.

BRIEF DESCRIPTION OF THE DRAWINGS

The invention will now be described in greater detail by means of preferred embodiments with reference to the attached drawings, in which.

DETAILED DESCRIPTION OF THE INVENTION

Figure 1:
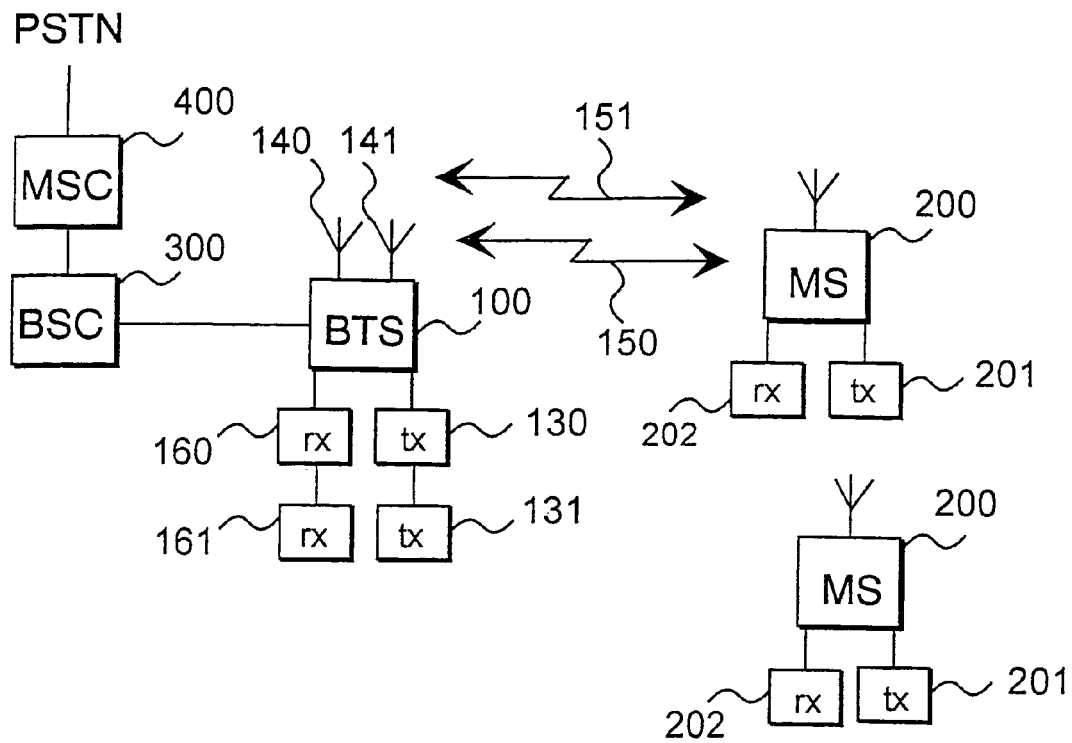
FIG. 1 shows a radio system of the invention.

FIG. 1 shows a radio system comprising a base station 100, subscriber terminals 200, a base station controller 300 and a mobile switching centre 400. The subscriber terminals 200 can be mobile phones, for instance. The base station comprises transmitters 130, 131 and receivers 160, 161. In addition, the base station comprises antennas 140, 141 with which the base station transmits and receives signals. The base station transmits to a subscriber terminal and receives from a subscriber terminal a signal 150 by means of its antenna 140. In addition, the base station transmits to a subscriber terminal and receives from a subscriber terminal a signal 151 by means of its antenna 141. The figure shows that the subscriber terminal comprises a transmitter 201 and a receiver 202. The subscriber terminal can receive signals transmitted from the various antennas of the base station. The signals containing the same information received by the subscriber terminal can also be transmitted by different base stations.

Figure 2:
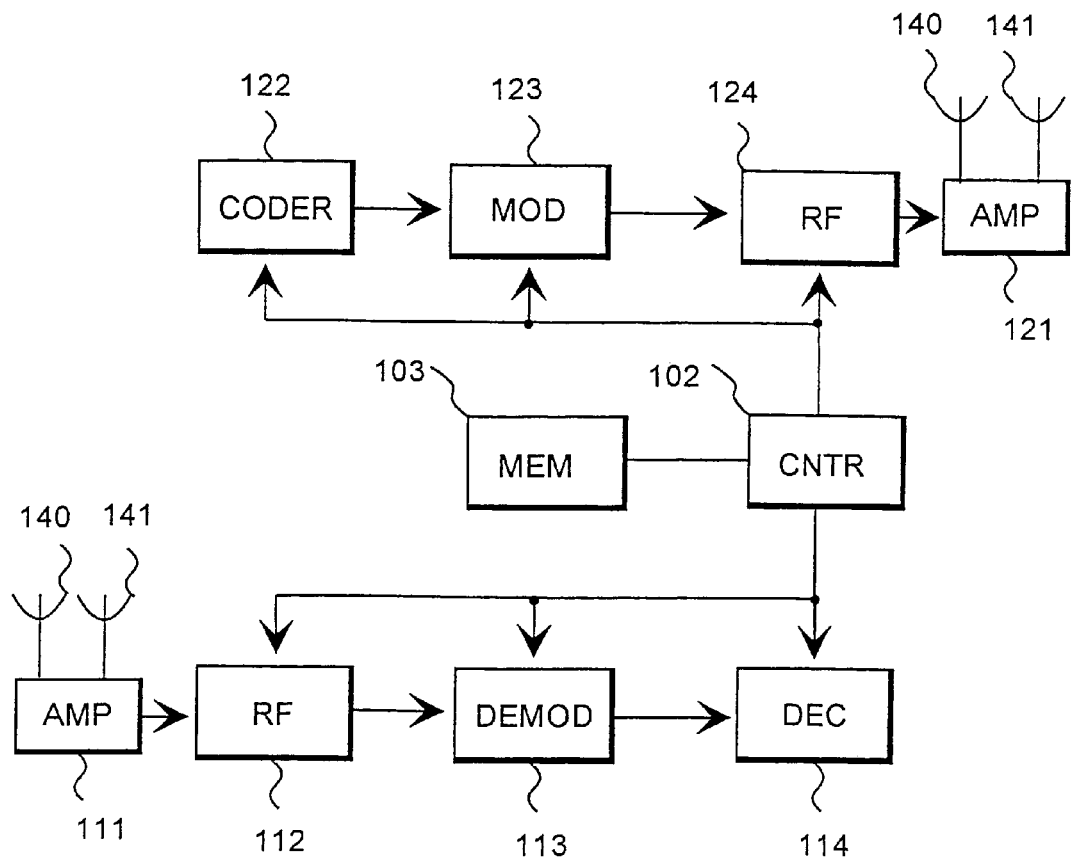
FIG. 2 shows the structure of a base station of the radio system.

FIG. 2 shows in greater detail the structure of the base station 100 in the radio system of the invention. The base station comprises antennas 140, 141 acting in practice as transceiver antennas. In addition, the base station comprises an amplifier 111, a radio frequency part 112, a demodulator 113 and a decoder 114 on the receiving side. The base station can use antenna diversity, for instance, in transmission. The antennas must be located far enough from each other when using antenna diversity. The distance of the antennas can be at least 10 to 20 fold, for instance, in relation to the used wavelength.

The antennas can also be adaptive antennas, for instance, in which case they allow the use of angle diversity in transmitting signals. The base station forms beams with the adaptive antennas to use in transmitting signals. The adaptive antennas are located at a distance of at most half of the used wavelength, for instance, in relation to each other.

The radio-frequency signal received by the base station is forwarded from the antenna to the amplifier 111 which amplifies the level of the received signal. The amplified signal is forwarded to the radio frequency part 112 which transfers the signal to an intermediate frequency. The radio frequency part 112 is connected to the demodulator 113 which returns the broadband signal to a narrowband data signal, if the signal in question is a CDMA signal. The invention is, however, not in any way restricted to the CDMA system, and the system can, for instance, be a TDMA system or a radio system operating according to another principle.

The data signal is forwarded from the demodulator 113 to the decoder 114 which decodes the data signal in a suitable manner. The signal coming in to the decoder 114 can be convolution-coded, for instance. The operation of the decoder 114 can be based on the Viterbi algorithm, for instance. Typically, the decoder 114 decrypts and deinterleaves the signal.

On the transmission side, the base station comprises an amplifier 121, a coder 122, a modulator 123 and a radio frequency part 124. The coder 122 receives a signal and, after coding it, transmits the signal to the modulator 123. The coder 122 can use convolution coding, for instance. In addition, the coder 122 encrypts the signal, for instance. The coder 122 also interleaves the signal bits or bit groups. In practice, the modulator 123 can act as a symbol modulator, for instance. If the transceiver is of CDMA type, the signal received from the modulator 123 is pseudo-random noise-coded into a broadband spread-spectrum signal. After this, the spread-spectrum signal is converted into radio frequency according to prior art in the radio frequency part 124. The radio-frequency signal is forwarded to the amplifier 121 which amplifies the signal. The amplified signal is transmitted via the antenna to the radio path. The base station also comprises a means 102 which controls the operation of the above-mentioned base station blocks, and a means 103 which stores data on the load status of the amplifiers, for instance. The means 103 can be implemented with a memory circuit, for instance.

Figure 3:
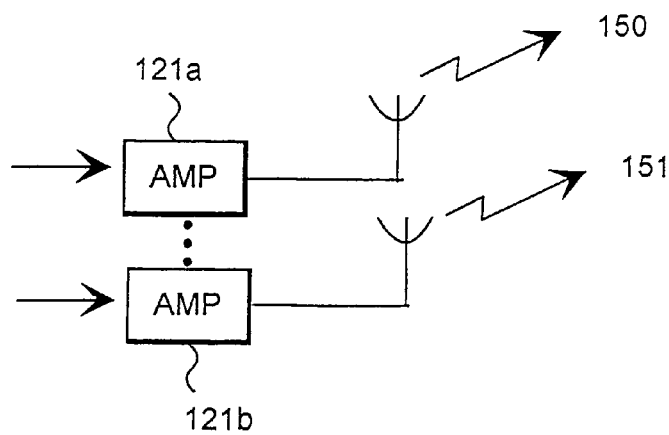
FIG. 3 shows a more detailed description of the base station.

In practice, the receiving side of the base station comprises several receiver branches. Correspondingly, the transmitting side of the base station may comprise several transmitter branches and each transmitter branch can be connected to its own antenna, for instance. In addition, the signals going through each transmitter branch are typically forwarded to different amplifiers for amplification. FIG. 3 illustrates the above-mentioned base station which has several amplifiers acting as power amplifiers on the transmitting side.

Figure 4:
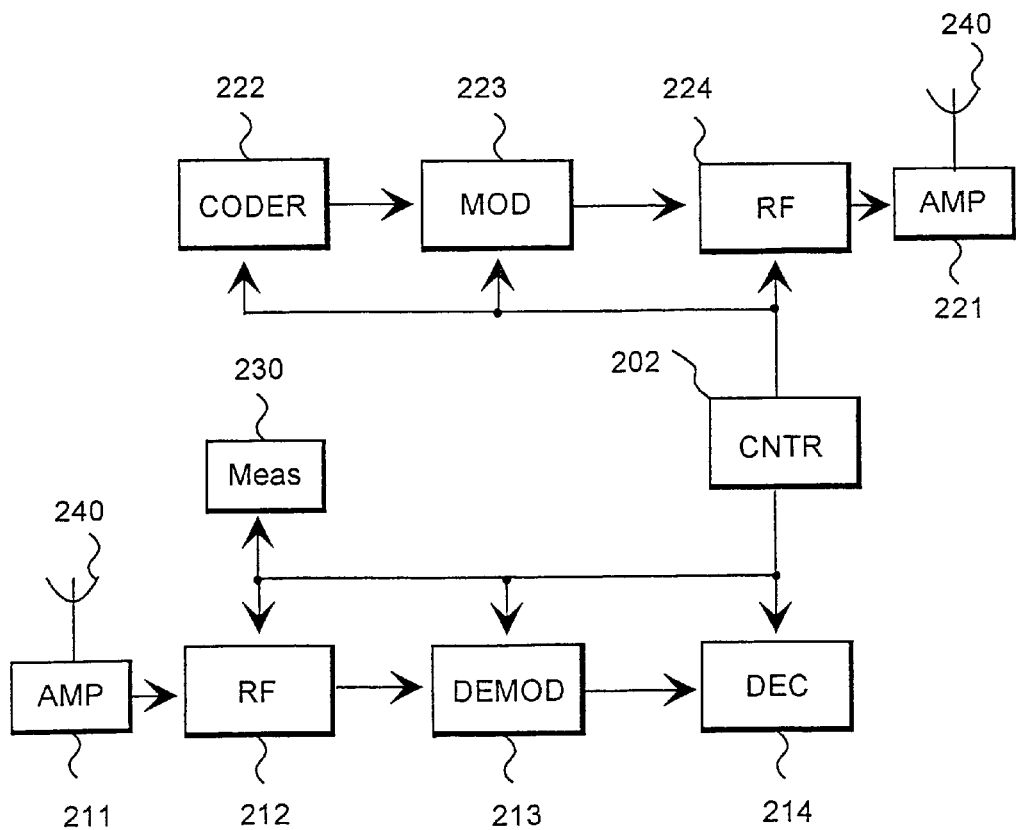
FIG. 4 shows the structure of a subscriber terminal in the radio system.

FIG. 4 shows in greater detail the structure of the subscriber terminal used in the radio system of the invention. The subscriber terminal comprises an antenna 240, an amplifier 211, a radio frequency part 212, a demodulator 213, a decoder 214, an amplifier 221, a coder 222, a modulator 223 and a radio frequency part 224, and a control means 202. In principle, the above-mentioned subscriber terminal parts function in the same way as the parts corresponding to said parts in the base station. In addition, the subscriber terminal comprises a measuring means 230 which measures the quality of the signals received by the subscriber terminal. Measuring the quality can be based on measuring signal strength, amplitude-to-power ratio, S/N ratio, signal energy or signal bit error ratio, for instance. The measuring means can measure the signal quality continuously or periodically.

The subscriber terminal can simultaneously receive signals from either the same base station or from several base stations. The measuring means 230 in the subscriber terminal measures the received signals. The purpose for measuring the signal quality is to select the most optimal antenna for the radio system to transmit the signal to the subscriber terminal. The transmission direction or the beam used in transmission can also be selected on the basis of signal quality measurement. The base station can use the load situation of an amplifier, for instance, as a selection criterion. Another purpose is that the final selection decision on the transmission antenna, transmission direction and/or amplifier is made either in the subscriber terminal or the base station.

Figure 5:
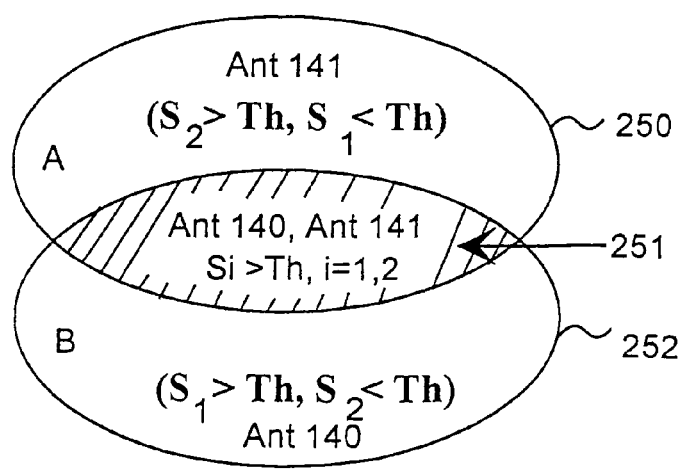
FIG. 5 illustrates the purpose of use of the threshold levels.

The measuring means 230 compares the measured signal with one or more threshold levels. FIG. 5 shows a diagram illustrating the purpose of use of the threshold levels used in the subscriber terminal. Let us assume that the subscriber terminal receives a signal 150 transmitted by an antenna 140, and a signal 151 transmitted by an antenna 141. There is at least one threshold level for the received signals, with which the signal quality is compared. The threshold levels can be pre-set at fixed values, for instance. In measuring the received signal, the placement of the signal being measured is examined in relation to the threshold level. The signal being measured can be either below or above the threshold level. In some special cases, the signal being measured may be at exactly the threshold level. In the radio system of the invention, a method known as the B-STD diversity method (Balanced Selective Transmit Algorithm) is used to help select the transmission antenna and transmission direction of the base station. The signals of different antennas or beams can be distinguished from each other in the subscriber terminal on the basis of different codes, their pilot signal or training sequence code.

Let us assume that in FIG. 5, the subscriber terminal receives a signal S1 and S2. Let us further assume that the base station antenna 140 transmits the signal S1 and the antenna 141 transmits the signal S2. When the quality of both signals exceeds the pre-set level Th, the subscriber terminal sends information on the quality of the signals to the base station, and consequently, either the antenna 140 which transmitted the signal S1 or the antenna 141 which transmitted the signal S2 can be selected as the final transmission antenna. In the above situation, both antennas 140, 141 can be selected as final transmission antennas. The same principle can also be used when selecting the beam or the transmission direction. In the situation described above, the base station makes the final decision on the transmission antenna, transmission beam or transmission direction on the basis of the information sent by the subscriber terminal. In practice, the means 102 in the base station makes the decision.

If the signal S1 exceeds the threshold, but the signal S2 is below it, the subscriber terminal sends information on the quality of the signals to the base station. After receiving the information, the base station continues to transmit the signal S1 through the antenna 140. If the signal S1 is below the threshold, but the signal S2 exceeds it, the subscriber terminal sends information on the quality of the signals to the base station, and having received it, the base station continues to transmit the signal S2 through antenna 141. In the above-mentioned situations, the final decision on the transmission antenna, for instance, is already made in the subscriber terminal.

If both signals S1, S2 are below the threshold level, the subscriber terminal sends information on the quality of the signals to the base station which can, for instance, stop transmitting both signals. Therefore, the setting of the threshold level has a high significance. The threshold level can be set to a level, for instance, that when the signal received by the subscriber terminal is below it, the base station antenna which transmitted the signal will not be taken into consideration in the selection process. However, when the quality of the signal received by the subscriber terminal is above the threshold level, the base station antenna which transmitted the signal is considered in the selection process. In the case described above, the subscriber terminal can send the information on the signal quality or antenna selection in one bit. If the subscriber terminal receives signals with M antennas, M bits are required to send all above-mentioned information to the base station.

FIG. 5 shows that on the basis of the quality measurement made by the subscriber terminal, preliminary candidates are selected for the transmission antenna, transmission direction or transmission beam of the base station. The final selection is made on the basis of the preliminary selection, and the final selection can be made either in the subscriber terminal or the base station depending on the case.

Figure 6:
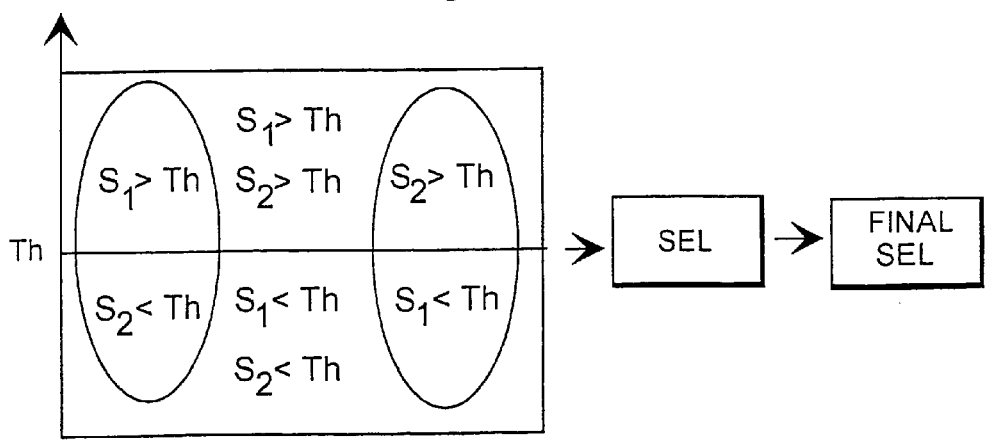
FIG. 6 illustrates the selection process used in the radio system.

FIG. 6 illustrates the selection process. FIG. 5 shows areas 250 and 252 which are ellipse-shaped. The areas 250 and 252 overlap slightly. The overlapping area 251, which is common to the areas 250, 252, is marked with lines. When the area 251 common to the areas 250 and 252 is subtracted from the area 250, an area A remains. When the area common to the areas 250 and 252 is subtracted from the area 252, an area B remains. Let us assume that the antenna 140 transmits a signal S1 and the antenna 141 a signal S2. When the signals received by the subscriber terminal fulfil the quality condition ($S_1$<Th, $S_2$>Th) in the area A, the antenna 141 is selected. When the signals received by the subscriber terminal fulfil the condition ($S_1$>Th, $S_2$<Th) in the area B, the antenna 140 is selected. In the two previous cases, the subscriber terminal makes the final decision on the transmission antenna used by the base station.

If the signals received by the subscriber terminal are in the area 251, the subscriber terminal sends information to the base station that both signals exceed the threshold. After receiving the information, the base station can, if necessary, select the antenna 140 and/or 141. In this situation, the base station makes the final selection on the transmission antenna. In addition to the antenna, it is also possible to select and make a decision on the transmission direction or the beam the base station uses for transmission. When the subscriber terminal transfers the decision selection to the base station, it simultaneously informs the base station of suitable antenna candidates. When the final decision on the selection is made in the base station, the means 102 in the base station selects the transmission beam causing the least interference. When the final decision on the selection is made in the subscriber terminal, the means 202 in the subscriber terminal selects the transmission beam causing the least interference to be the beam for the base station.

When the base station has been given the right to decide on the diversity antenna selection, the base station can make the decision on the transmission antenna on the basis of the load in the amplifier that feeds the antenna. The decision can, for instance, be based on the load of the network or amplifier at the moment on hand, or on a short-time or long-time load of the amplifier. The means 102 in the base station preferably selects the amplifier with the lowest load to feed the selected transmission antenna. This way, the load distribution of the amplifiers remains as even as possible all the time.

The actual load distribution of the amplifiers can be continuously estimated by various means. The means 102 can keep a record of the selections made during a longer period of time. In addition, the means 102 can keep a record of the current and short-term selections. The estimation can easily be done by means of two counters. The counter keeping track of the longer-term selections, can, for instance, calculate an average power for each amplifier. The counter keeping track of the short-term selections can instead monitor the maximum loads, for instance. The latter counter can, for instance, keep a record of the load situation of a time slot being transmitted at a given time. If several counters are used, the incidence probabilities of various load situations can be calculated by different statistical methods.

The load situation data can be utilized when updating the utilization rate data of the amplifiers. The data being updated can be weighted taking into consideration the data transmission rate used in transmission, because the data transmission rate is comparable with the required transmission power. In practice this means that when transmitting a signal burst at a basic rate, the counter is incremented by one unit, for instance. When a burst is transmitted at q times the basic rate, the counter is incremented by one q unit.

Because the data transmission method is based on using a closed loop, the benefit derived from the use of the method is slightly reduced when the subscriber terminal moves at a high speed. When the radio system has detected that the rate of movement of the subscriber terminal exceeds a predefined limit rate, the base station can send to the subscriber terminal a command, on the basis of which the subscriber terminal stops transmitting the antenna selection bits to the base station. The radio system can utilize another diversity method for the downlink direction during the time that the subscriber terminal moves at a high speed. If the subscriber terminal can measure its own speed, the subscriber terminal can send information on a suitable transmission antenna to the base station. The selection of an antenna transmitting in the downlink direction can also be based on a combined selection in which the decision on the antenna is made on the basis of the decisions made by the subscriber terminal and the base station.

If there are M antennas, for instance, to select from, the amount of antenna selection information sent by the subscriber terminal depends on the capacity reserved for the transmission of said information at a given time. If the data field in the signal frame is large enough, information on the best antennas and their order of priority can be sent to the base station. It can be generalized that the more transmission antennas are used in the downlink direction, the more probable it is that the most optimal transmission antenna is selected. On the other hand, the subscriber terminal must then have enough capacity to transmit several selection bits to the base station.

A subscriber terminal acting as a receiver uses one or more threshold levels, the application of which enables the division and grouping of the signals in received channels. By means of the division, the downlink channels can be divided into different groups, such as 'good', 'average' and 'poor'.

The threshold or thresholds are set in such a manner that they divide the operating area as appropriately as possible so that the different channel spaces can be distinguished. When using only one threshold, special attention should be paid to selecting the threshold, because the channels are then divided relatively roughly. If the threshold is set too low, antenna selection can be made on the basis of a channel having a high attenuation, which is not advisable. If the threshold is set too high, even good-quality channels may be rejected during the division process. Power control commands sent earlier can also be taken into account when setting the threshold.

If several channels are acceptable to the subscriber terminal for downlink transmission, the subscriber terminal lets the base station select the most suitable transmission antenna. The selection is based on the load of the power amplifiers in the base station. In the above situation, the base station can balance the load situation of the base stations within its own capability.

If signals, which when received are of 'poor' quality, are transmitted to the subscriber terminal on two different channels, the information on the quality of the channels can be sent to the base station in two bits by a signalling combination of '11', for instance. Using signalling, the subscriber terminal informs the base station that, in principle, none of the measured downlink channels are good for transmission, and consequently the transmission of said signals can be interrupted. Transmission interruption can be used when transmitting data in packets, for instance. When using real-time transmission and when all signals received by the subscriber terminal are below the threshold level, the antenna which transmitted the best signal is selected to continue transmitting the signal.

If the base station is sending data or non-real-time data, for instance, the base station can, if necessary, interrupt the transmission until better channel conditions are again available. This way, it is possible to avoid a situation in which the base station tries in vain to establish a connection by increasing its transmission power, thus increasing interference to other signals in the radio system. It is thus possible to prevent the occurrence of common channel interference, for instance, by means of the method. In real-time transmission, in which the signalling flow should be continuous, a base station can transmit a signal to the subscriber terminal through several antennas.

Even though the invention has been explained in the above with reference to an example in accordance with the accompanying drawings, it is obvious that the invention is not restricted to it but can be modified in many ways within the scope of the inventive idea disclosed in the attached claims.

The invention claimed is:

1. A data transmission method used in a radio system comprising a subscriber terminal and at least one base station which transmits signals to the subscriber terminal by means of its antenna, the method comprising:
   determining the quality of signals received by the subscriber terminal by comparing the received signals with at least one signal quality threshold level,
   sending to the base station, which transmitted a signal that exceeded the threshold, information on the antennas which transmitted the signal that exceeded the threshold, or information on transmission directions from which the signal that exceeded the threshold were received, and
   selecting from the antennas, which transmitted the signal that exceeded the threshold, an antenna or antennas to continue transmission of the signal to said subscriber terminal, or selecting from the transmission directions, from which the signal that exceeded the threshold were received, a transmission direction or directions, in which to continue transmission of the signal to said subscriber terminal,
   wherein the signals transmitted by the base stations are amplified by amplifiers, and the antenna which is connected to one of the amplifiers with the lowest load is selected as the transmission antenna.

2. A data transmission method used in a radio system comprising a subscriber terminal and at least one base station which transmits signals to the subscriber terminal by means of its antenna, the method comprising:
   determining the quality of signals received by the subscriber terminal by comparing the received signals with at least one signal quality threshold level,
   sending to the base station, which transmitted a signal that exceeded the threshold, information on the antennas which transmitted the signal that exceeded the threshold, or information on transmission directions from which the signal that exceeded the threshold were received, and
   selecting from the antennas, which transmitted the signal that exceeded the threshold, an antenna or antennas to continue transmission of the signal to said subscriber terminal, or selecting from the transmission directions, from which the signal that exceeded the threshold were received, a transmission direction or directions, in which to continue transmission of the signal to said subscriber terminal,
   wherein the signals transmitted by the base stations are amplified by amplifiers before transmission, and the selection decision is made on the basis of the load situation of the amplifiers.

3. A radio system comprising at least one subscriber terminal and at least one base station comprising an antenna by means of which the base station transmits signals to the subscriber terminal, wherein
   the subscriber terminal comprises a measuring means which determines the quality of signals received by the subscriber terminal by comparing the received signals with at least one signal quality threshold level,
   the subscriber terminal sends to the base station, which transmitted a signal that exceeded the threshold, information on the antennas by which the signal that exceeded the threshold were transmitted, or information on transmission directions from which the signal that exceeded the threshold were received,
   the base station comprises a means which selects from the antennas, which transmitted the signal that exceeded the threshold, an antenna or antennas to continue to transmit the signal to said subscriber terminal, or the means selects from the transmission directions of the signal, which exceeded the threshold, a transmission direction or directions in which the base station continues to transmit the signal, and
   wherein the base station comprises amplifiers which amplify the signals before their transmission, and the means selects as the transmission antenna of the base station the antenna or antennas which are connected to the amplifier with the smallest load.

4. A radio system comprising at least one subscriber terminal and at least one base station comprising an antenna by means of which the base station transmits signals to the subscriber terminal, wherein
   the subscriber terminal comprises a measuring means which determines the quality of signals received by the subscriber terminal by comparing the received signals with at least one signal quality threshold level,
   the subscriber terminal sends to the base station, which transmitted a signal that exceeded the threshold, information on the antennas by which the signal that exceeded the threshold were transmitted, or information on transmission directions from which the signal that exceeded the threshold were received,
   the base station comprises a means which selects from the antennas, which transmitted the signal that exceeded the threshold, an antenna or antennas to continue to transmit the signal to said subscriber terminal, or the means selects from the transmission directions of the signal, which exceeded the threshold, a transmission direction or directions in which the base station continues to transmit the signal, and
   wherein the base station comprises amplifiers which amplify the signals before their transmission, and the means makes the selection decision on the basis of the load situation of the amplifiers.

5. A base station comprising:

means for receiving information from a subscriber terminal on antennas which transmitted a signal that exceeded at least one signal quality threshold level;

means for selecting from the antennas, an antenna or antennas to continue to transmit the signal to the subscriber terminal, or from transmission directions of the signal, which exceeded the threshold, a transmission direction or directions in which the base station continues to transmit the signal; and means for amplifying the signals before their transmission, wherein the means for selecting selects, as a transmission antenna of the base station, the antenna or antennas which are connected to the amplifying means with the smallest load.

6. A base station comprising:

means for receiving information from a subscriber terminal on antennas that transmitted a signal that exceeded at least one signal quality threshold level;

means for selecting, from the antennas, an antenna or antennas to continue to transmit the signal to the subscriber terminal, or from transmission directions of the signal, which exceed the threshold, a transmission direction or directions in which the base station continues to transmit the signal; and means for amplifying the signals before their transmission, wherein the means for selecting bases selection on a load situation of the amplifying means.

7. A base station comprising:

a receiver configured to receive information from a subscriber terminal on antennas which transmit a signal that exceeds at least one signal quality threshold level;

a controller configured to select from the antennas, an antenna or antennas to continue to transmit the signal to the subscriber terminal, or from transmission directions of the signal, which exceed the threshold, a transmission direction or directions in which the base station continues to transmit the signal; and at least one amplifier configured to amplify the signals before their transmission, wherein the controller is configured to select, as a transmission antenna of the base station, the antenna or antennas which are connected to the at least one amplifier with the smallest load.

8. A base station comprising:

a receiver configured to receive information from a subscriber terminal on antennas that transmit a signal that exceeds at least one signal quality threshold level;

a controller configured to select, from the antennas, an antenna or antennas to continue to transmit the signal to the subscriber terminal, or from transmission directions of the signal, which exceed the threshold, a transmission direction or directions in which the base station continues to transmit the signal; and at least one amplifier configured to amplify the signals before their transmission, wherein the controller is configured to select based on a load situation of the at least one amplifier.

* * * * *